United States Patent [19]
Suzuki et al.

[11] Patent Number: 6,052,203
[45] Date of Patent: Apr. 18, 2000

[54] PRINTING SYSTEM, PRINTER, PRINTER DRIVER AND PROGRAM STORAGE MEDIUM

[75] Inventors: Tetsuya Suzuki, Nagano; Sunao Murata, Hokkaido; Toshiaki Isobe, Nagano; Takeshi Miyashita, Nagano; Shinji Nozawa, Nagano; Toshiyuki Hattori, Nagano, all of Japan

[73] Assignee: Seiko Epson Corporation, Tokyo, Japan

[21] Appl. No.: 09/129,882

[22] Filed: Aug. 6, 1998

Related U.S. Application Data

[63] Continuation-in-part of application No. 08/972,839, Nov. 18, 1997.

[30] Foreign Application Priority Data

Nov. 19, 1996 [JP] Japan .................................. 8-308410
Aug. 6, 1997 [JP] Japan .................................. 9-211659

[51] Int. Cl.$^7$ ........................................ G06F 15/00
[52] U.S. Cl. ............................ 358/1.9; 358/1.16
[58] Field of Search .................. 358/1.9, 1.16, 358/1.17, 1.2, 1.15, 1.13, 1.5, 1.1, 1.18, 534, 535, 536, 455, 456, 457, 458, 459, 460, 404, 444, 298; 347/132; 382/162, 169, 274, 275, 278, 279, 276, 232; 345/432; 372/38

[56] References Cited

U.S. PATENT DOCUMENTS

| | | | |
|---|---|---|---|
| 5,081,631 | 1/1992 | Dhurjaty | 372/38 |
| 5,134,495 | 7/1992 | Frazier et al. | 358/298 |
| 5,187,495 | 2/1993 | Tanimoto et al. | 346/108 |
| 5,255,351 | 10/1993 | Takanashi et al. | 358/1.9 |
| 5,287,209 | 2/1994 | Hiratsuka et al. | 358/1.9 |
| 5,396,584 | 3/1995 | Lee et al. | 345/432 |
| 5,495,341 | 2/1996 | Kawana et al. | 358/298 |
| 5,633,669 | 5/1997 | Hada et al. | 347/132 |
| 5,689,586 | 11/1997 | Lin | 382/232 |
| 5,949,966 | 9/1999 | Hayashi | 358/1.9 |

FOREIGN PATENT DOCUMENTS

| | | |
|---|---|---|
| 0 109 005 | 5/1984 | European Pat. Off. |
| 0 216 536 | 1/1987 | European Pat. Off. |
| 0 216 462 | 4/1987 | European Pat. Off. |
| 0 528 365 | 2/1993 | European Pat. Off. |
| WO 95/02938 | 1/1995 | WIPO |

Primary Examiner—Dov Popovici
Attorney, Agent, or Firm—Sughrue, Mion, Zinn, Macpeak & Seas, PLLC

[57] ABSTRACT

To convert gray-scale data of each pixel of image data into pulse-width data for each pixel, a RAM is provided. The RAM has nine pixel memory regions corresponding to nine pixels a to i for forming, for example, a 3×3 pixel matrix on the output image. In each of the pixel memory regions, there are stored pulse-width data items corresponding to values which are permitted for gray-scale data to have. Pulse-width data items in the pixel memory regions are slightly different from one another among pixel memory regions. Gray-scale data of each pixel of image data and address word composed of gray-scale data of each pixel of image data and coordinates of each pixel in the 3×3 matrix is supplied to the RAM. Thus, pulse-width data corresponding to gray-scale data is read from the pixel memory region so that a laser drive pulse having a pulse width corresponding to the read pulse-width data is generated.

8 Claims, 12 Drawing Sheets

PRINTING SYSTEM, PRINTER, PRINTER DRIVER AND PROGRAM STORAGE MEDIUM

This is a Continuation-in-Part of application Ser. No. 08/972,839 filed Nov. 18, 1997, the entirety of which is incorporated by reference.

BACKGROUND OF THE INVENTION

1. Field of the Invention

The present invention relates to a printing technique using a computer, and more particularly to a printing system which is capable of meeting a variety of needs of users. Means for generating pulse-width data for expressing a multiplicity of gray scales is incorporated in the printing system so as to supply the pulse-width data to a printing engine of a toner-transfer-type printing apparatus, such as a laser printer or a copying machine in the printing system.

2. Description of the Related Art

A toner-transfer-type printing apparatus is able to print a multi-gray-scale image by adjusting the pulse width of a drive pulse signal for driving drawing laser in a printing engine because the quantity of toner for each pixel to be allowed to adhere can be changed. Since the minimum size of toner particles however is limited, the number of gray scale levels, which can be expressed, is reduced in inverse proportion to the resolution of an image required to be printed. An assumption is made that image data having a resolution of 600 dpi and 256 gray scale levels is created on a personal computer and image data above is printed by a laser printer having a printing resolution of 600 dpi. One pixel having a resolution of 600 dpi is in the form of a square region, one side of which is ⅟₆₀₀ inch. The number of toner particles allowed to adhere to the square region is limited to about 20 to 30. Therefore, the image printed by the laser printer is able to reproduce at most 20 to 30 gray scale levels.

As described above, the conventional toner-transfer-type printing apparatus suffers from a problem in that the apparatus cannot reproduce a number of gray scale levels on a print output therefrom even if image data expressing the number of gray scale levels exceeding the number of toner particles allowed to adhere to one pixel region is supplied.

By the way, a usual printing system incorporates a digital printer and a host computer connected to the digital computer. The host computer has a printer driver installed thereon. The printer driver produces a print command issued to the printer to print an object which must be printed (hereinafter called an "object"). The printer receives the print command from the host computer so as to form an image of the object on a printing medium, such as paper. The digital printer is usually adapted to a binary printing method with which whether or not a small spot (dot) of a coloring material is formed is used to form an image.

The object includes plural types of objects, such as text data, graphic data and a natural image and the like. In this specification, the text basically means a characters described with data in a character code (text) format or a set of the characters. The graphics are in the form of so-called line drawing or a graphic image. The graphics mean an image which can be described with data in a vector graphic format (for example, data describing a function determining outline paths, the thickness of each outline and whether or not areas included in the outlines are filled in). The natural image is typified by a photograph having a substantially continuous gradation. The natural image means an image which can be expressed by only data (data formed by sets of pixel values indicating the density of each pixel or the gradation of the same) in the form which is called a raster image or a bit map image.

When a document is printed by a usual printing system, original data of the document is finally converted into a binary raster image which determines whether or not a dot of the coloring material is formed at the position of each pixel in a page of the document. The conversion includes an image drawing process (also called a rasterizing or rendering) and a half toning (also called a binary-coding) process. The image drawing process is a process for converting a text or vector graphic into a raster image. The half toning process is a process for converting a raster image having a multiplicity of gradations into a binary raster image so as to express the multiple gradations in a pseudo manner.

The usual printing system has two image drawing steps. That is, an intermediate code is produced for each band obtained by dividing one page, and the produced intermediate codes are stored in a memory (hereinafter called an "intermediate coding step"). The intermediate code is formed by listing sets of the raster image of each object (for example, each character, each figure or each photograph) and information about the size of the raster image and the position of the raster image in the page. Then, the raster image of the overall band is completely formed from the intermediate code of each band immediately before the band is printed so as to expand the raster image on the memory (hereinafter called "band expansion").

Specific methods of the foregoing image drawing and half toning processes and the share of the operation which must be performed by the printer driver and the printer vary for each system (that is, depending on the type of the printer). Also the share of the intermediate coding step and the band expansion step between the printer driver and the printer varies depending on the type of the printer.

A variety of needs for the printing operation are emerged from users. For example, a user sometimes requires a high speed printing operation, while a user sometimes requires a high-quality printing operation. Moreover, there is a requirement for faithfully printing an image, which cannot be drawn by an image-drawing device provided for the printer, as the image is observed on a display unit of a host computer (so called "What You See Is What You Get" abbreviated to "WYS/WYG").

Also a requirement from a user differs depending on the type of an object contained in a document. For example, a text or a graphic image is usually required to be printed such that the edges are clearly expressed. On the other hand, a natural image is required to be printed in such a manner that the gradation and the multiplicity of colors are maintained. If different objects overlap one another, there is a requirement for faithfully reproducing the logical relationship (for example, "and", "or" and "xor" hereinafter called a raster operation (ROP)) of the overlapping portions.

The conventional printing systems, however, cannot meet the above-mentioned various requirements. Although for example, a system incorporating a certain laser printer is able to clearly and quickly print text or graphic, the system has unsatisfactory performance to reproduce the image with a high quality.

SUMMARY OF THE INVENTION

Accordingly, an object of the present invention is to enable a toner-transfer-type printing system to reproduce, on an output image therefrom, a number of gray scale levels which is larger than the number of toner particles allowed to adhere to one pixel region, and more specifically to print an output image with which the sense of sight of a human being recognizes a fact that such a large number of gray scale levels has been reproduced, while meeting a variety of requirements from users.

To achieve the above-mentioned object, according to one aspect of the present invention, there is provided a printing, system comprising: a printer driver installed on a host apparatus; and a printer arranged to receive a print command issued from the printer driver so as to perform printing, wherein the printer has a high-speed image drawing device which is capable of drawing an image at high speed and a high-quality image drawing device which is capable of drawing an image having a high quality, and printing is performed by selectively using the high-speed image drawing device or the high-quality image drawing device or by combining the devices.

The foregoing printing system is able to meet the requirement for high speed printing from a user when the high-speed image drawing device is selected. When the high-quality image drawing device is selected, the requirement for high quality printing can be met.

The high-quality image drawing device may be a device which draws an image on a color space having a relatively large number of colors (for example, full color). If the high-quality image drawing device is selected in the foregoing case, the ROP can be maintained and therefore, a satisfactory result of printing can be obtained. The high-speed image drawing device may be a device which draws an image in a color space having a relatively small number of colors (a 2-bit depth for each of C, M, Y and K). If the high-speed image drawing device is selected in the foregoing case, an image can quickly be printed such that only a small memory is required. Although the ROP cannot perfectly be reproduced, an image of a type free from overlapping of objects can be printed such that a satisfactory quality is maintained.

Further, if the high-quality image drawing device is selected in the foregoing case so as to draw an image on a color space having a relatively large number of colors, a pulse-width data generating means incorporated in the printer is used. This means generates pulse-width data for each pixel of an output image in accordance with gray-scale data of each pixel in image data. This means has a memory for converting gray-scale data of each pixel of image data into pulse-width data of each pixel of an output image. The memory has N×M pixel memory regions corresponding to N×M pixels disposed to form N×M pixel matrices on the output image (N and M are positive integers). Various pulse-width data items, corresponding to various values which are possible for gray-scale data to have, are stored in each of the pixel memory regions. When the coordinates of each pixel in the N×M matrices corresponding to the pixels of image and gray-scale data are supplied to the memory, pulse-width data corresponding to gray-scale data is read from the pixel memory region in the memory instructed with the coordinates. The pulse-width data generating means enables the overall N×M matrices on the output image to reproduce the number of gray scale levels which is about N×M times the number of gray scale levels which can be expressed by one pixel. In general, it is difficult for the sense of sight of a human being to distinguish pixels each having a high resolution of about 300 dpi from each other. When a printing engine for forming an output image having a high resolution of, for example, 600 dpi is employed, expression of a required gray scale with an appropriate size near the minimum limit for the sense of sight for a human being, such as 2×2 pixel matrices (corresponding to 300 dpi) or 3×3 pixel matrices (corresponding to 200 dpi), enables for the sense of sight for a human being to recognize as if the required number of the gray scale levels has been reproduced on the output image.

It is preferable that an inverted γ-characteristic for correcting a γ-characteristic of the printing engine is incorporated to pulse-width data in the memory. In the foregoing case, a structure in which the inverted γ-characteristics incorporated to pulse-width data are made to be slightly different from one another among the pixel memory regions causes a precise inverted γ-characteristic to appear in pulse-width data of the overall N×M matrices attributable to a principle like the above-mentioned principle with which the number of gray scale levels which can be expressed increases. As a result, precise γ-correction can be performed.

It is preferable that the pulse-width data generating means further comprises position-data generating means which receives pulse-width data read from the memory to subject pulse-width data items of pixels on the two sides of each pixel on the output image to a comparison to generate position data corresponding to a result of the comparison, position data being generated for each pixel on the output image. Position data generated by the above-mentioned means indicates a pixel of the pixels on the two sides of each pixel on the output image that has higher density. When the position at which a pulse signal to be supplied to the printing engine is generated is controlled in accordance with position data, adjustment can be performed in such a manner that the position at which toner for each pixel on the output image is allowed to adhere is approached to the pixel of the side pixels having higher density. The process for collecting the positions, at each of which toner is allowed to adhere to form pixels, to integrate dots has a conventional technique for improving the quality of an output image. However, the means for generating a pulse-width data disclosed in the means, arranged in such a manner that the toner adhesion position is automatically determined in accordance with pulse-width data for each pixel read from the memory, enables a necessity of previously providing, to image data, position data for instructing the toner adhesion position to be eliminated. Thus, an advantage can be realized in that the capacity of the image memory for storing image data can be saved by the foregoing degree.

Although the functions of the printer and the printer driver in the printing system according to the present invention can be realized by an exclusive hardware circuit, the functions can be performed in a typical case. A computer program for giving the above-mentioned functions to the computer can be installed on the computer from a medium, such as any one of a variety of disk-type storage apparatus, semiconductor memories and communication networks.

DETAILED DESCRIPTION OF THE PREFERRED EMBODIMENTS

Figure 1:
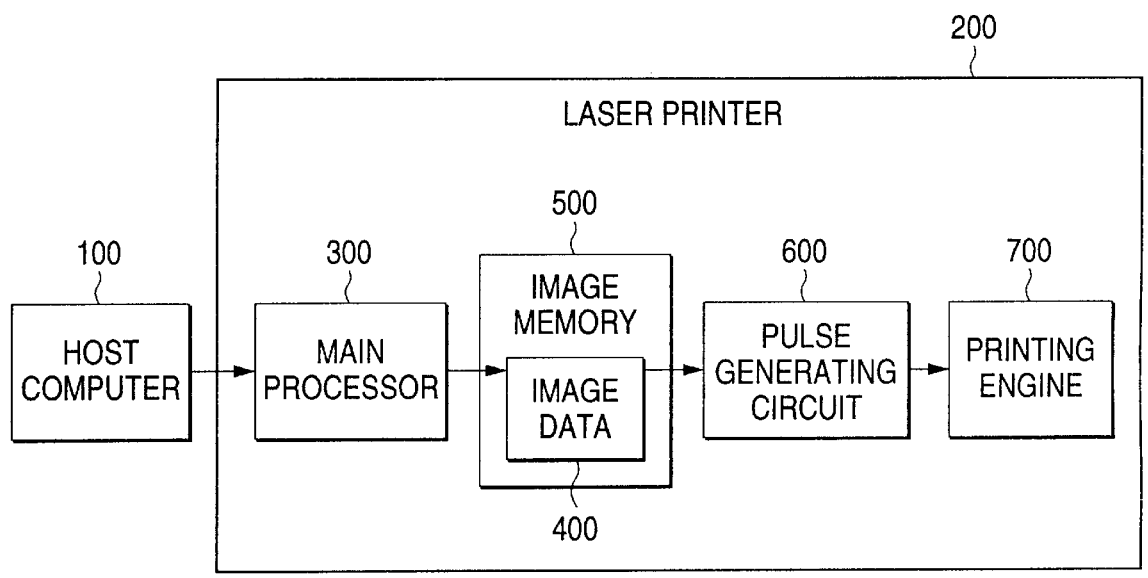
FIG. 1 is a block diagram showing the overall structure of an embodiment of a laser printer including a pulse generating circuit.

FIG. 1 shows an overall structure of an embodiment of a laser printer including a pulse generating circuit.

As shown in FIG. 1, a laser printer 200 has a main processor (a microcomputer) 300. The main processor 300 processes sequential printing commands supplied from a host computer 100 to generate a bit-map type image data 400. Image data 400 is stored in an image memory 500. A pulse generating circuit 600 according to the present invention is connected to the image memory 500. The pulse generating circuit 600 makes a direct memory access (DMA) to read image data 400 from the image memory 500 so as to generate, from gray-scale data of each pixel of image data 400, a laser drive pulse for driving a drawing laser in a printing engine 700.

Figure 2:
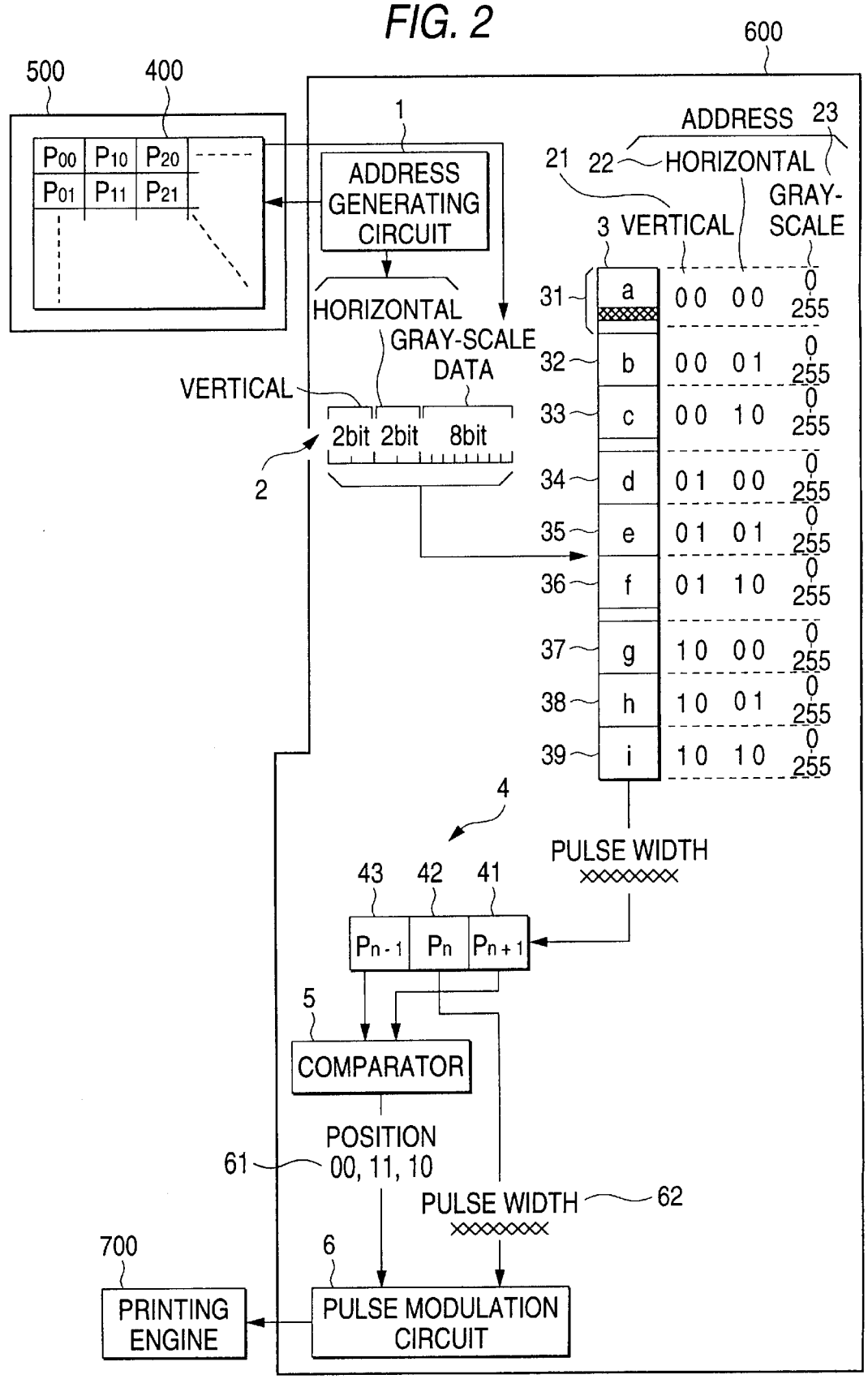
FIG. 2 is a circuit diagram showing the pulse generating circuit.

FIG. 2 shows the structure of the pulse generating circuit 600. FIGS. 3(A) to 3(C) shows the operation of the pulse generating circuit 600.

As shown in FIG. 2, the pulse generating circuit 600 includes an address generating circuit 1, a RAM 3, a shift register 4, a comparator 5 and a pulse modulation circuit 6.

The address generating circuit 1 generates address data for pixels P00, P01, P20, . . . , of image data 400 in the image memory 500 to supply address data to the image memory 500. The image memory 500 responds each of the pixel address data items to output gray-scale data 23 of each of the pixels P00, P01, P20, . . . , of image data 400 to the pulse generating circuit 600. Gray-scale data of each of the pixels P00, P01, P20, . . . , of image data 400 is, for example, 8-bit data. Namely, the gray scale value of each pixel is expressed by 256 levels.

The RAM 3 has nine pixel memory regions 31 to 39. Each of the pixel memory regions 31 to 39 corresponds to nine pixels a to i which form, on an output image which must be printed out, one 3×3 pixel matrix 7 as shown in FIG. 3(B). In each of the pixel memory regions 31 to 39, 256 eight-bit words (indicated with xxxxxxxx) are stored. Each eight-bit word indicates the pulse width of a laser drive pulse which is supplied to the printing engine 700. By adjusting the pulse width, the quantity of toner for each pixel on the output image, that is, the gray scale can be adjusted. Therefore, 256 types of 8-bit pulse-width data items for changing the gradations of the corresponding pixels a to i on the output image are stored in each of the pixel memory regions 31 to 39.

All of the pulse-width data items are previously programmed in a ROM (not shown) in the laser printer so as to be loaded from the ROM to the RAM 3 when, for example, the laser printer is turned on. It is preferable that standard pulse-width data read from the ROM be subjected to correction which is performed in consideration of the environmental conditions, including the temperature, humidity and power supply voltage at the loading operation and then corrected pulse-width data be stored in the RAM 3.

Each pulse-width data in the RAM 3 is addressed with a 12-bit address word 2. The address word 2 includes a 2-bit vertical coordinate data 21, 2-bit horizontal coordinate data 22 and 8-bit (having 256 gray scale levels) gray-scale data 23. Vertical coordinate data 21 and horizontal coordinate data 22 are generated by the address generating circuit 1 in accordance with each of the pixel address data items to indicate the vertical coordinates and the horizontal coordinates of each pixel of one 3×3 pixel matrix 7 on the output image shown in FIG. 3(B). Eight-bit gray-scale data 23 is each pixel data of image data 400 read from the image memory 500.

Figure 3:
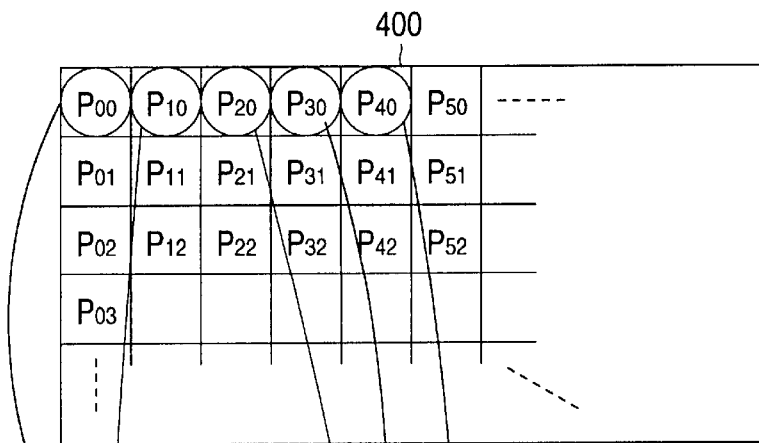
FIGS. 3(A) to 3(C) are diagrams showing the operation of the pulse generating circuit.
Figure 3:
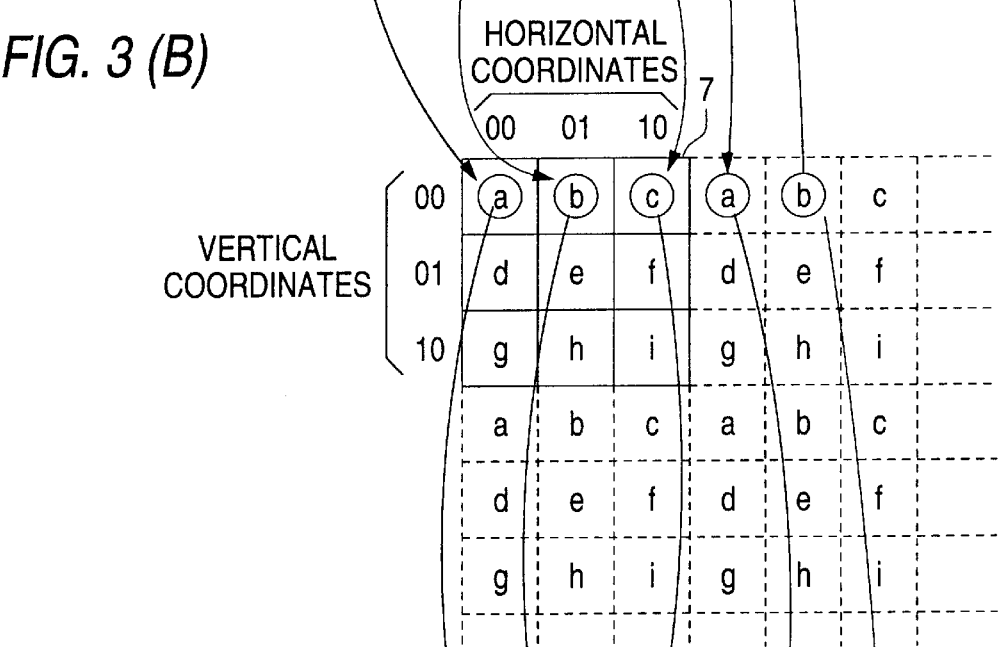
Figure 3:
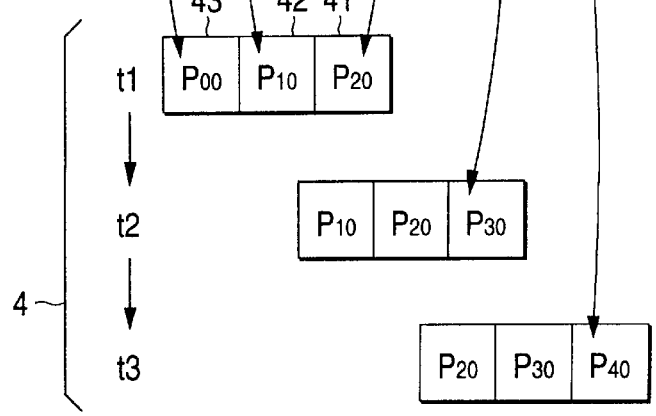

Each pixel of image data 400 in the image memory 500 is sequentially addressed in the order of raster scan by the address generating circuit 1. Therefore, as shown in FIG. 3 (A), reading starts at pixel P00 at the left-hand end of the uppermost line, and then pixels P10, P20, P30, . . . , on the uppermost line are sequentially read. Then, pixels P01, P11, P21, P31, . . . , on the second line are, similarly, sequentially read, and then pixels on the third line are read. The foregoing operation is repeated to reach the lowermost line. Each pixel in the 3×3 pixel matrix 7 on the output image as shown in FIG. 3(B) is made to correspond to each pixel of image data 400. Since a multiplicity of 3×3 pixel matrices 7 are virtually tiled (in the form of tiles) on the output image as shown in FIG. 3(B), each of all of the pixels of image data 400 are made to correspond to any one of the pixel in the 3×3 pixel matrix 7. For example, pixels P00, P10, P20, P30 and P40 of image data 400 correspond to pixels a, b, c, a and b of the 3×3 pixel matrix 7, respectively. In accordance with the correspondence made as described above, the address generating circuit 1 generates, from the address data of each pixel, the above-mentioned vertical coordinate data 21 and horizontal coordinate data 22 for each pixel.

Vertical coordinate data 21 and horizontal coordinate data 22 for each pixel address one pixel memory region in the RAM 3 corresponding to the position of each pixel on the 3×3 pixel matrix 7. Gray-scale data 23 for each pixel addresses one pulse-width data item in one corresponding pixel memory region. As described above, one pulse-width data item in the RAM 3 for each pixel of image data 400 is addressed. Pulse-width data above is read from the RAM 3, and then supplied to the shift register 4.

The shift register 4 has three stages 41, 42 and 43 and receives pulse-width data sequentially read from the RAM 3 by the first stage 41 thereof to sequentially transfer the same to the second stage 42 and the third stage 43. Thus, the shift register 4 is caused to always have pulse-width data of three pixels Pn−1, Pn and Pn+1 continued in the horizontal direction on image data 400. As a result, the three pixels Pn−1, Pn and Pn+1 move on the image along the raster scanning passage. Assuming that pulse-width data of pixels P00, P10 and P20 is stored in the shift register 4 at time t1 as shown in FIG. 3(C), pulse-width data of pixels P10, P20 and P30 shifted to the right by one pixel is stored in next time t2, and then pulse-width data P20, P30 and P40 further shifted by one pixel is stored at next time t3.

Pulse-width data items of pixels Pn−1 and Pn+1 in the stages 43 and 41 at the two ends of the shift register 4 are supplied to the comparator 5. The comparator 5 subjects pulse-width data items of the two pixels Pn−1 and Pn+1 to a comparison to output 2-bit position data 61 indicating the position of a pixel having a larger pulse width (that is, a pixel having a higher density). If the right-hand pixel Pn+1 has a higher density, "00" is output as position data 61. If the left-hand pixel Pn−1 has a higher density, "10" is output. If the densities of the two pixels Pn−1 and Pn+1 are the same, "11" is output. Position data 61 above is supplied to the pulse modulation circuit 6. Pulse-width data 62 of pixel Pn in the central stage 42 of the shift register 4 is directly supplied to the pulse modulation circuit 6.

In accordance with 2-bit position data 61 and 8-bit pulse-width data 62, the pulse modulation circuit 6 generates a laser drive pulse for drawing the central pixel Pn as follows: the pulse width (a duty ratio) of the laser drive pulse is determined in accordance with 8-bit pulse-width data 62. Therefore, the duty ratio of the drive pulse, that is, the gray scale value of the pixel is modulated to 256 levels. The position of the laser drive pulse in terms of time, that is, the spatial position in the pixel region to which toner is allowed to adhere is determined to be in the right-half portion if position data 61 is "00". If data above is "10", the position is determined to be in the left-half portion. If data above is "11", the position is determined to be the center. That is, the toner adhesion position is approached to the pixel Pn−1 or the pixel Pn+1 adjacent laterally that has a higher density.

Figure 4:
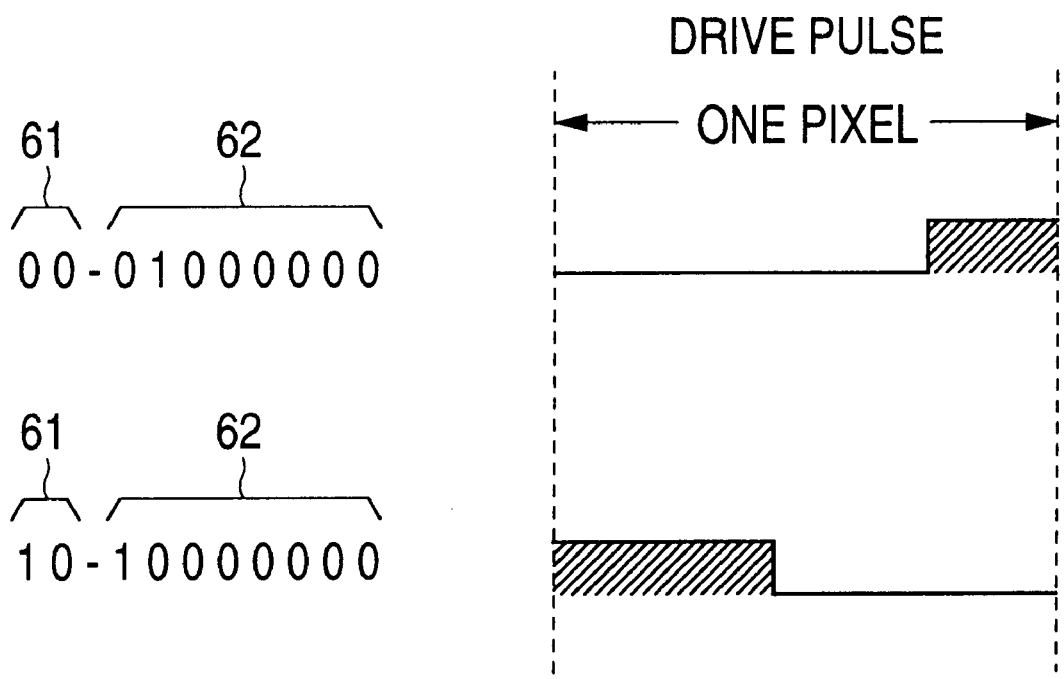
FIG. 4 is a diagram showing an example of a laser drive pulse.

FIG. 4 shows an example of the thus-generated laser drive pulse. If position data 61 is "00" and pulse-width data 62 is "01000000", a drive pulse shifted to the right and having a gradation value of 64 (a duty ratio of 64/256=¼) is generated. If position data 61 is "10 and pulse-width data 62 is "10000000", a drive pulse shifted to the left and having a gradation value of 128 (a duty ratio of 128/256=½) is generated.

As described above, a drive pulse, the pulse width of which has been modulated to 256 levels, is generated for each pixel so as to be supplied to the printing engine 700 so that a laser beam, for drawing an electrostatic latent image is modulated. As described above, a printing engine having printing performance of a resolution of 600 dpi is able to express gradation of at most 20 to 30 levels for each pixel even if a drive pulse modulated to 256 levels is supplied. That is, only the number of gray scale levels which is the same as that when the pulse width of a laser drive pulse has been modulated to 20 to 30 levels can be reproduced. However, the above-mentioned pulse generating circuit 600 according to the present invention, arranged to slightly change pulse-width data items in the RAM 3 for each pixel, is able to cause the sense of sight of a human being to recognize as if 256 gray scale levels has been expressed.

Figure 5:
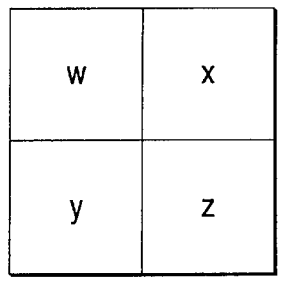
FIGS. 5(A) to 5(C) are diagrams showing the principle for expressing a multiplicity of gray scale levels.
Figure 5:
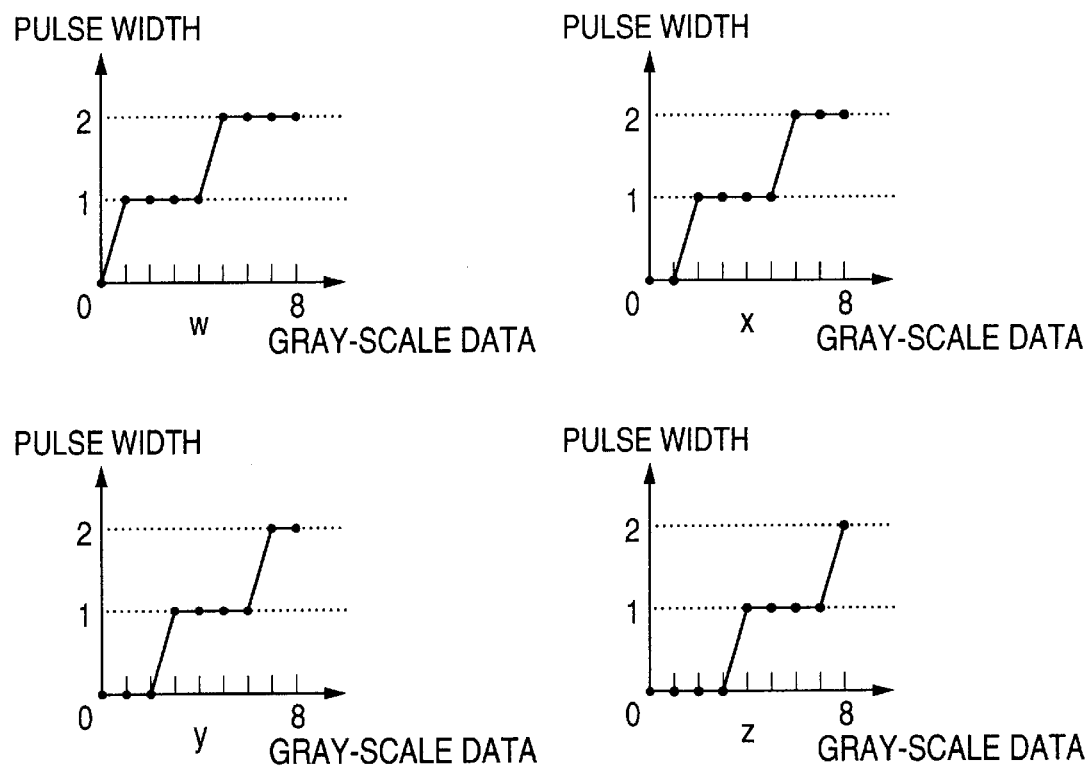
Figure 5:
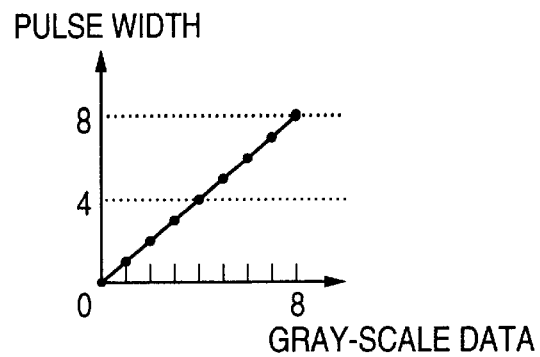

FIGS. 5(A) to 5(C) shows a principle of the foregoing structure. To easily understand the principle, a model formed by simplifying the above-mentioned circuit 600 will now be described. As shown in FIG. 5(A), a matrix having four pixels w, x, y and z is assumed. An assumption is further made that gray-scale data has 9 levels from 0 to 8 for each pixel. Moreover, another assumption is made that the substantial number of gray scale levels (that is, the gray scale levels of one pixel which can be reproduced by the engine) of the pulse width of the laser drive pulse is three levels from 0 to 2.

An assumption is made that the contents of pulse-width data corresponding to gray-scale data for the above-mentioned model are slightly changed among the pixels w, x, y and z, as shown in FIG. 5(B). In the example shown in FIG. 5(B), the pulse widths of the same gray-scale data items are changed in such a manner that the pixel w has a largest width, the pixel x and the pixel y have next widths and the pixel z has a smallest pulse width. As a result, the pulse widths of the four pixels w, x, y and z are averaged in the overall matrix region having the four pixels w, x, y and z as shown in FIG. 5(C) so that a result is obtained in that as if modulation with eight levels has been performed.

It is considerably difficult for the sense of sight of a human being to distinguish fine pixels of about 300 dpi from each other. Therefore, if the pixels w, x, y and z shown in FIG. 5(A) are 600 dpi pixels, the sense of sight for a human being is caused to integrally recognize the foregoing pixels w, x, y and z rather than individually recognizing the same. As a result, reproduction of 8 gray scale levels as shown in FIG. 5(C) is recognized.

In accordance with the above-mentioned principle, the pulse generating circuit 600 according to this embodiment has a structure that pulse-width data items, which are slightly different from one another, are stored in the nine pixel memory regions 31 to 39 in the RAM 3. As a result, the pulse widths of the nine pixels a to i are averaged in the overall 3×_3 pixel matrix shown in FIG. 3(B) so that the number of gray scale levels which is nine times the 20 to 30 levels each of which is the substantial number of gray scale levels of each pixel is expressed. If the printing engine has great performance about 600 dpi, the sense of sight for a human being usually integrally recognizes pixels in the 3×_3 pixel matrix in place of recognizing the same individually. Therefore, the sense of sight for a human being recognizes that 256 levels have been reproduced in the printed out image.

Figure 6:
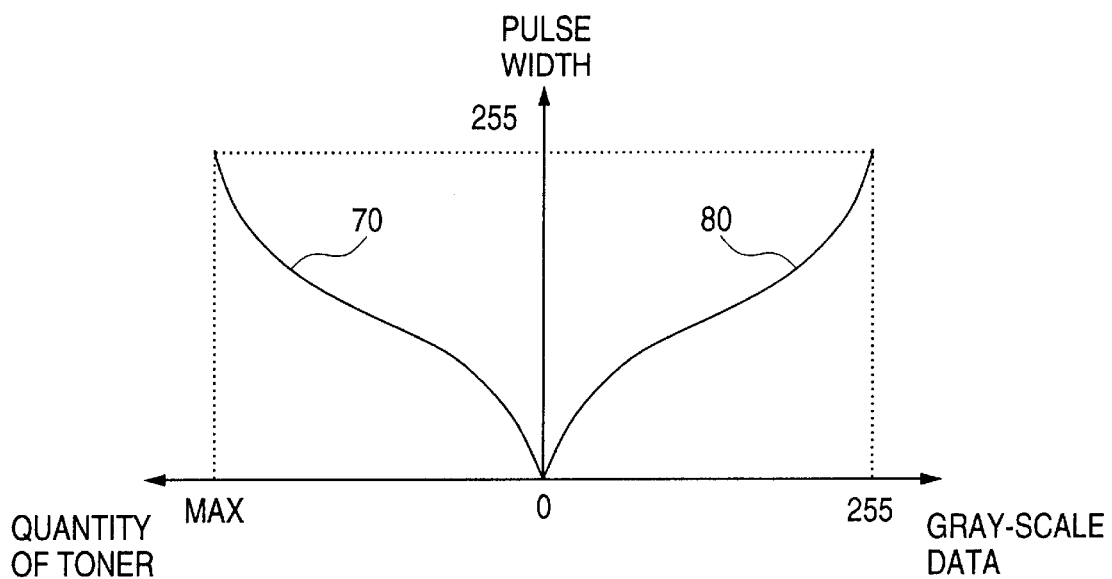
FIGS. 6(A) and 6(B) are characteristic graphs showing the principle of γ-correction.
Figure 6:
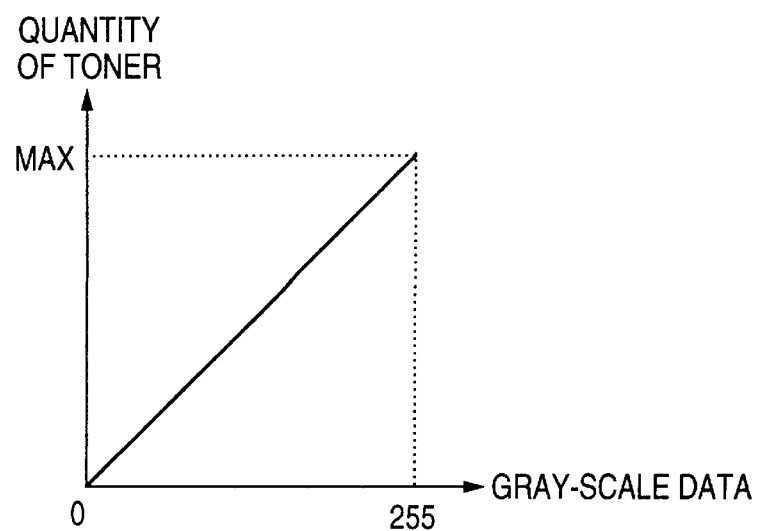

The circuit according to this embodiment is arranged in such a manner that an inverted γ-characteristic which is inversion to the γ-characteristic of the printing engine is incorporated to pulse-width data in the RAM 3 in order to correct the γ-characteristic of the printing engine. FIG. 6(A) shows a γ-characteristic 70 of the printing engine and an inverted γ-characteristic 80 incorporated to pulse-width data. As indicated with the γ-characteristic 70, the pulse width of the drive pulse and the actual quantity of toner which is allowed to adhere have not a linear relationship. In particular, the change ratio of the toner adhesion quantity with respect to the pulse width is reduced in a region in which the pulse width (the duty ratio) is near the maximum value (a dense region). Therefore, the inverted γ-characteristic 80 is incorporated to the relationship of the pulse width with respect to gray-scale data so that the relationship of the toner adhesion quantity with respect to gray-scale data is made to be linear and thus the γ-characteristic is corrected, as shown in FIG. 6(B).

The pulse generating circuit 600 according to this embodiment uses a principle like the principle described with reference to FIGS. 5(A) to 5(C) in order to precisely perform the γ-correction. That is, the inverted γ-characteristic 80 incorporated to pulse-width data in the RAM 3 is made to be slightly different among the pixel memory regions so that a precise inverted γ-characteristic is realized in the 3×3 pixel matrix 7 shown in FIG. 3(B).

Figure 7:
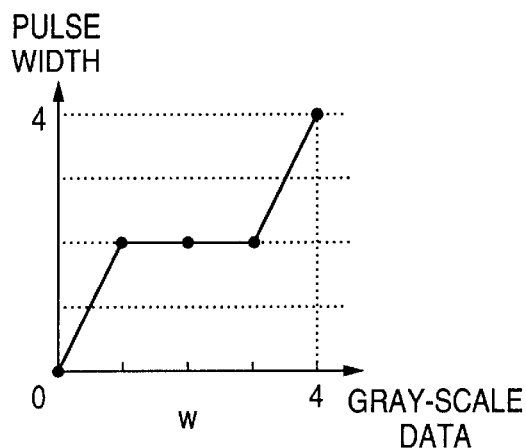
FIGS. 7(A) and 7(B) are diagrams showing the principle of precise γ-correction.
Figure 7:
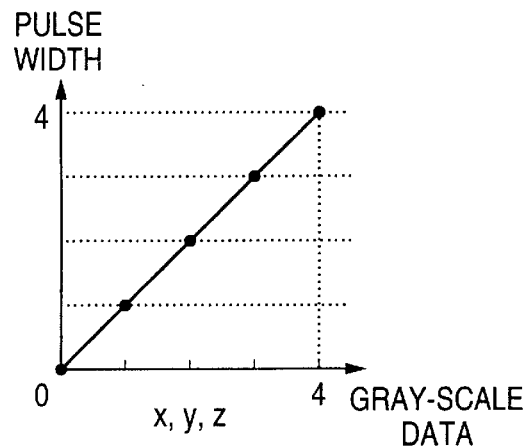
Figure 7:
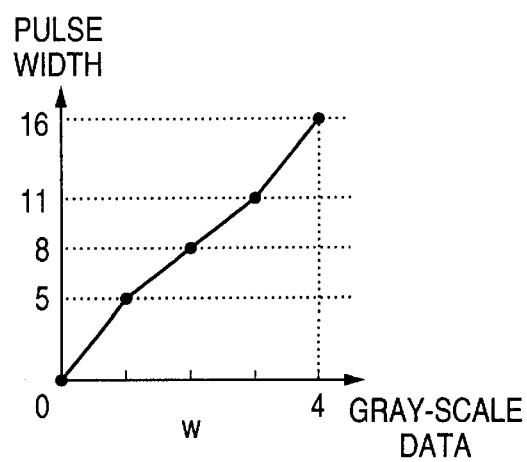

FIGS. 7(A) and 7(B) show the above-mentioned principle by using the simplified 4-pixel matrix model shown in FIG. 5(A). An assumption is made that pulse-width data to which an inverted γ-characteristic as shown in the left-hand portion of FIG. 7(A) has been incorporated is provided for the pixel w of the four pixels w, x, y and z and linear pulse-width data as shown in the left-hand portion of FIG. 7(A) is provided for each of the three pixels x, y and z. Since the sense of sight for a human being easily recognizes the four pixels w, x, y and z as an integrated body in the above-mentioned case, an inverted γ-characteristic in the form in which the four pixels are integrated as shown in FIG. 7(B) appears. When the inverted γ-characteristic in the integrated form shown in FIG. 7(B) is subjected to a comparison with the inverted γ-characteristic of one pixel shown in FIG. 7(A), the inverted γ-characteristic in the integrated form has substantially 16 modulation levels of pulse width which is four times the number of modulation levels realized by the inverted γ-characteristic of one pixel which is four levels. Therefore, precise γ-correction can be performed.

Figure 8:
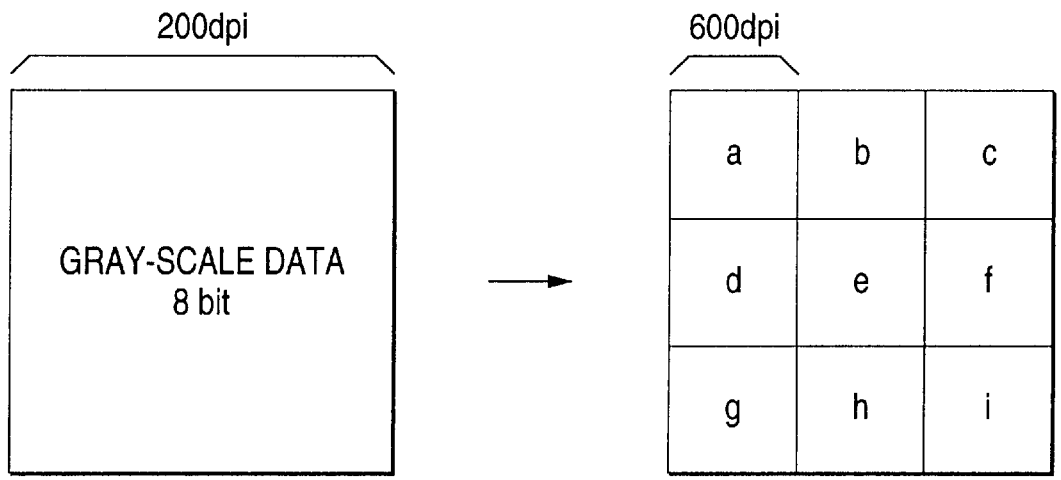
FIG. 8 is a diagram showing the operation which is performed when a 200-dpi image is printed.

The pulse generating circuit 600 according to this embodiment is effective when image data 400 having a resolution lower than that of the printing engine is processed. An assumption is made that the resolution of the printing engine is, for example, 600 dpi. As described above with reference to FIG. 2, the address generating circuit 1 generates one address word 2 for each pixel to supply the same to the RAM 3 when the address generating circuit 1 processes image data having a resolution of 600 dpi which is the same as that of the engine. When image data 400 having a resolution of, for example, 200 dpi which is lower than the resolution of the engine is processed, the address generating circuit 1 repeatedly scans each line of 200-dpi image data 400 three times because one 200 dpi pixel includes nine 600-dpi pixels a to i as shown in FIG. 8 to repeatedly read gray-scale data of each pixel on each line three time so as to generate vertical and horizontal address data items 21 and 22 of one pixel among the nine 600-dpi pixels a to i. Thus, nine laser drive pulses for drawing nine 600-dpi pixels can be generated from 200-dpi gray-scale data of one pixel. As can be understood from the principle described with reference to FIGS. 5(A) to 5(C), real 256 gray scale levels can be reproduced for each 200-dpi pixel. Note that the above-mentioned process which is performed by the address generating circuit 1 can be realized by software as well as an exclusive hardware.

Figure 9:
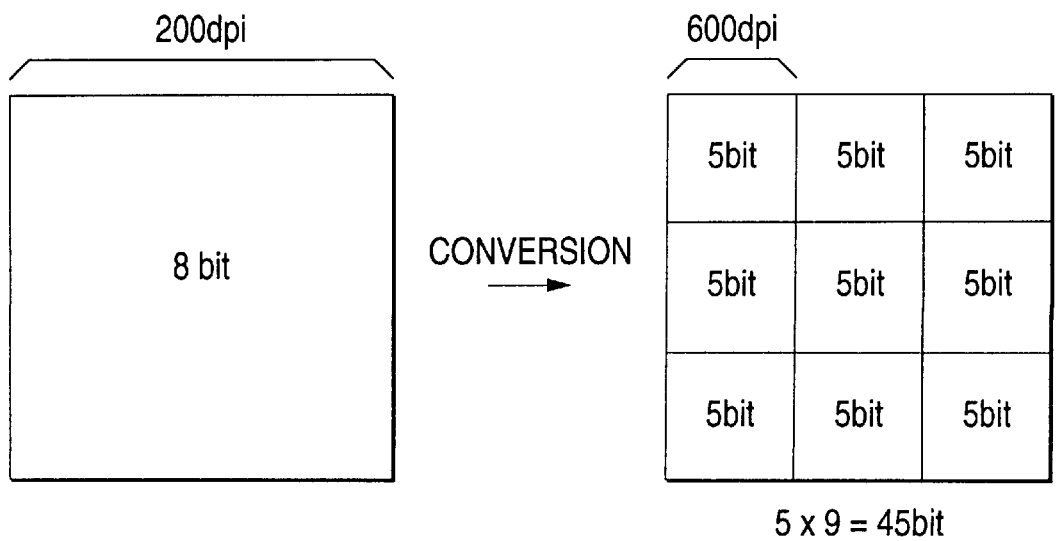
FIG. 9 is a diagram showing a demerit realized when a software process is performed.

The pulse generating circuit 600 according to this embodiment has the structure that gray-scale data is converted into pulse-width data by reading pulse-width data from the RAM 3 as shown in FIG. 2 in place of employing a software process. Therefore, an advantage is realized in that the capacity of the image memory for storing image data can be reduced when image data having a resolution lower than the performance of the engine is processed. If the operation, which is performed by the circuit according to this embodiment, is carried out by a software operation to process, for example, 200-dpi image data, software above must divide one 200-dpi pixel into nine 600-dpi pixels after which it generates pulse-width data (a gray scale value) for each of the nine 600-dpi pixels, as shown in FIG. 9. Since the number of gray scale levels which can be reproduced by one 600-dpi pixel is 20 to 30 as described above, for example, five-bit data is required for each of the 600-dpi pixel to express the pixel. Therefore, data in a quantity that 5 bits×9=45 bits is required to be generated for each of 200-dpi pixels, thus causing the image memory 500 having a large capacity capable of storing the foregoing data item to be required. If the circuit according to this embodiment is employed, only 8-bit data is required to be stored in the image memory 500 for each of the 200-dpi pixels. Thus, the required capacity of the memory can significantly be reduced as compared with the software process.

Figure 10:
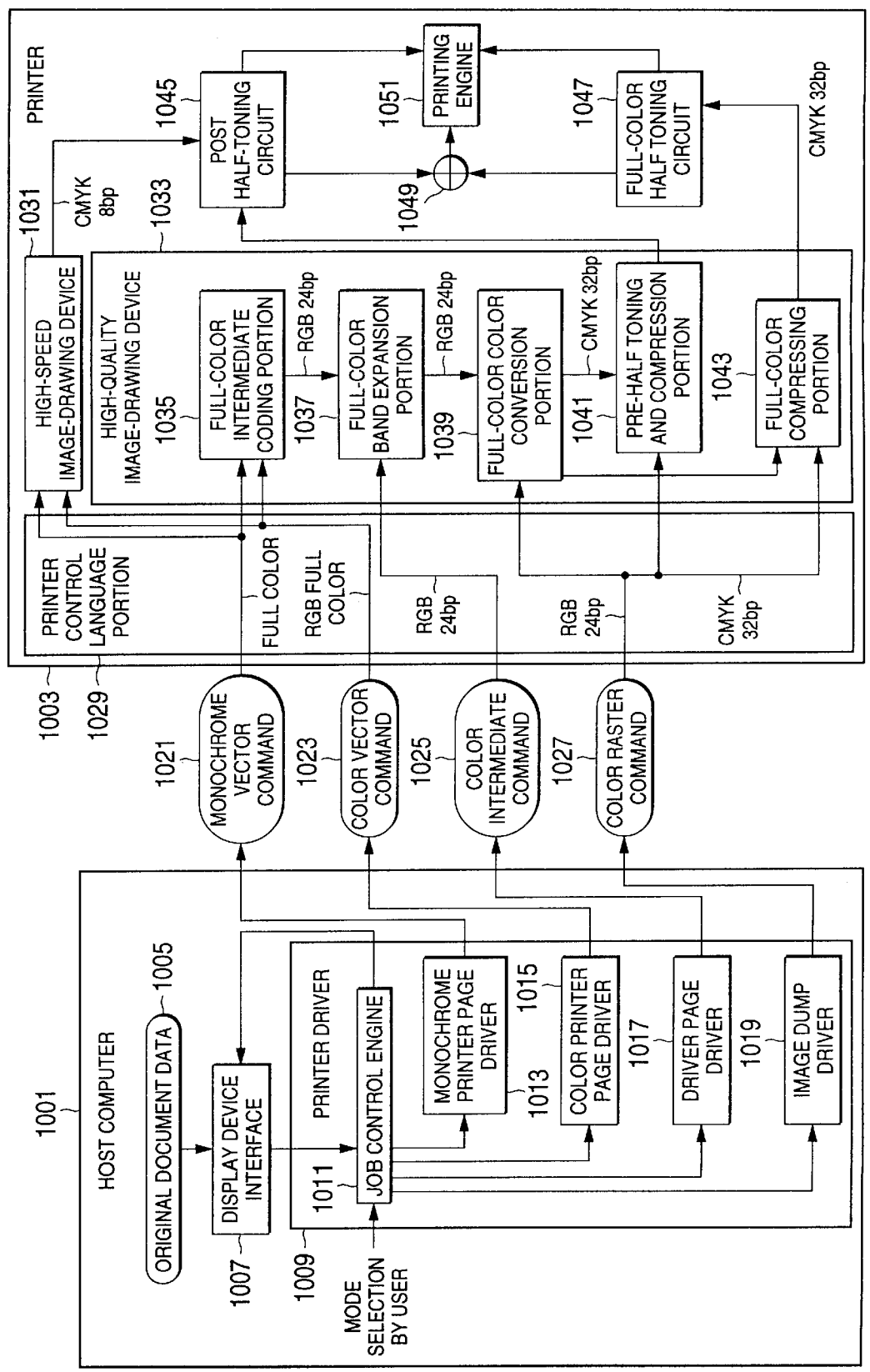
FIG. 10 is a block diagram showing the overall structure of a printing system according to an embodiment of the present invention.

FIG. 10 shows a block diagram showing the overall structure of a printing system according to an embodiment of the present invention. The means for generating pulse-width data according to the present invention is incorporated in this printing system. Detailed descriptions will be provided hereinafter.

A printer 1003 is connected to a host computer 1001. The host computer 1001 has the printer driver 1009 installed thereon. When a document is printed, a display device interface 1007 of the OS (Operating System) of the host computer 1001 converts original-document data 1005 stored in the host computer 1001 into a sequential image-drawing command described in a predetermined language. The display device interface 1007 is a program module which is called GDI (Graphics Device Interface) in, for example, Windows (Trade Mark) which is the OS for a personal computer of Microsoft, U.S.

The display device interface 1007 of the GDI is able to invoke device drivers of a variety of display devices, such as a display unit and a printer. When a printing operation is performed, the display device interface 1007 invokes a printer driver 1009. The display device interface 1007 makes an inquiry to the printer driver 1009 about the formats of the image-drawing commands which can be handled by the printer driver 1009. Then, the display device interface 1007 produces an image-drawing command in the format replied from the printer driver 1009 so as to supply the image-drawing command to the printer driver 1009. If original-document data 1005 contains elliptic graphics in a case where the printer driver 1009 has a function of drawing the ellipse, the display device interface 1007 uses the foregoing function. If the printer driver 1009 has not the above-mentioned function, the display device interface 1007 is able to spontaneously calculate the raster image of the ellipse so as to supply the raster image to the printer driver 1009.

When the display device interface 1007 uses the image-drawing function of the printer driver 1009, all of objects contained in original-document data 1005 cannot completely and faithfully be reproduced if the image-drawing function is unsatisfactory (that is, WYS/WYG cannot sometimes be realized). When the image-drawing function of the printer driver 9 is not used and the display device interface 1007 spontaneously fully draws the document go as to supply the drawn image to the printer driver 1009, WYS/WYG can reliably be realized.

The printer driver 1009 incorporates a job control engine 1011 and a plurality of image-drawing modules 1013, 1015, 1017 and 1019. The job control engine 1011 invokes any one of the image-drawing modules 1013, 1015, 1017 and 1019 to correspond to selection of a mode performed by a user or automatic selection performed spontaneously. Specifically, the image-drawing modules 1013, 1015, 1017 and 1019 are a monochrome printer page driver 1013, a color printer page driver 1015, a driver page driver 1017 and an image dump driver 101. The term "printer page" means an operation mode in which the image-drawing function of the printer 1003 is mainly used to draw an image. The term "driver page" means an operation mode in which both of the image-drawing function of the printer driver 1009 and the image-drawing function of the printer 1003 are used to draw an image. The term "image dump" means an operation mode in which the display device interface 1007 draws an image and the printer driver 1009 is required to simply supply (dump) the drawn raster image to the printer 1003.

Specifically, the image-drawing modules 1013, 1015, 1017 and 1019 have the following functions:

(1) Monochrome Printer Page Driver 1013

An image-drawing command supplied from the display device interface 1007 is converted into a print command (hereinafter called a monochrome and vector command) 1021 in the form of monochrome full-gradation vector graphics (text and a raster image may be contained) in a printer control language supported-by the printer 1003.

(2) Color Printer Page Driver 1015

An image-drawing command supplied from the display device interface 1007 is converted into a print command (hereinafter called a color and vector command) 1023 in the form of an RGB full color vector graphics (text and a raster image may be contained) in the printer control language supported by the printer 1003.

(3) Driver Page Driver 1017

An image-drawing command supplied from the display device interface 1007 is converted into a print command (hereinafter called a color and intermediate command) 1025 in the form of an RGB full color intermediate code (obtained by forming each object into a raster image) in the printer control language supported by the printer 1003.

(4) Image Dump Driver 1019

An image-drawing command (which is in the form of an RGB or CMYK full color raster image because the display device interface 1007 draws an image in the foregoing case) supplied from the display device interface 1007 is converted into a print command (hereinafter called a color and raster command) 1027 in the form of an RGB or CMYK full color raster image in the printer control language supported by the printer 1003.

The print commands 1021, 1023, 1035 and 1027 produced by the printer driver 1009 are supplied to the printer 1003 through the display device interface 1007 (not shown).

The printer 1003 incorporates a printer control language portion 1029, two types of image-drawing devices, that is, a high-speed image-drawing device 1031 and a high-quality image-drawing device 1033 and two types of half toning circuits, that is, a post half toning circuit 1045 and a full-color half toning circuit 1047. The printer control language portion 1029 and the image-drawing devices 1031 and 1033 are program modules in a typical case. The half toning circuits 1045 and 1047 are hardware circuits in a typical case. The present invention is not limited to the above-mentioned structure. The printer 1003 further incorporates a printing engine 1051 which is a mechanism for actually printing an image on a printing medium.

The printer control language portion 1029 interprets the print commands 1021, 1023, 1025 and 1027 supplied from the host computer 1001 so as to invoke either of the high-speed image-drawing device 1031 or the high-quality image-drawing device 1033.

The high-speed image-drawing device 1031 performs a high-speed image drawing operation in accordance with the vector commands 1021 and 1023 supplied from the host computer 1001. The high-speed image drawing operation is performed such that initially a pre-half-toning operation and, in a case of color printing, color conversion are performed in a process in which an intermediate code for each band is produced (although the operation which must be performed when color printing is performed will now be described to simplify the description, the operation for monochrome printing is performed similarly to an operation for processing one color component in the color printing operation). The pre-half-toning operation is performed such that a full color image (that is, 8-bit depth for each of R, G and B) supplied from the host computer 1 and expressed with the vector command 1023 is converted into a 2-bit depth image for each color by using an appropriate half toning method.

Thus, the quantity of data of the image which must be processed can significantly be reduced, and thus the high-speed process can be performed. The color conversion is performed such that image values for expressing RGB are converted into image values for expressing CMYK which are suitable for use in a printing operation. As a result, the high-speed image-drawing device 1031 produces intermediate codes with which 2-bit-depth images for each of CMYK can be reproduced. The intermediate codes are temporarily stored in a memory (not shown).

The high-speed image-drawing device 1031 stores the intermediate code for each band in the memory, and then expands the intermediate code for each band into an overall raster image for each band when the printing engine 1051 attempts to print each band. Then, the high-speed image-drawing device 1031 compresses the raster image by an appropriate reversible compressing method, such as a predicting Huffman coding method, so as to store compressed raster image in the memory. Also the band image expanded on the memory is an image of 2-bit-depth for each of CMYK. The band image is transferred to the post half toning circuit 1045. The post half toning circuit 1045 produces a binary raster image indicating whether or not a dot of each of CMYK is formed from the 2-bit-depth raster image for each of CMYK so as to supply the binary raster image to the printing engine 1051.

As described above, the high-speed image-drawing device 1031 performs the production of the intermediate code and expansion of the band image on the color space of the 2-bit-depth for each of CMYK. Therefore, a large memory is not used and thus a high speed drawing operation can be performed. The high-speed image-drawing device 1031 is designed to draw an image having a high resolution, for example, 600 dpi, corresponding to the small number of bits for expressing the colors. Therefore, text or graphics can be drawn such that their edges are expressed clearly. Although the above-mentioned advantages can be obtained, the band image expansion which is performed on the color space of the 2-bit-depth for each of CMYK results in a problem to arise in that ROP (logical calculations of the portions in which objects overlap one another) cannot substantially be reproduced.

On the other hand, the high-quality image-drawing device 1033 performs the production of the intermediate code and expansion of the band image on a color space in full color (that is, 8-bit-depth for each of RGB or CMYK). The high-quality image-drawing device 1033 incorporates a full-color intermediate coding portion 1035, a full-color band expanding portion 1037, a full-color conversion portion 1039, a pre-half-toning and compressing portion 1041 and a full-color compressing portion 1043. The high-quality image-drawing device 1033 is able to receive the monochrome and vector command 1021, the color and vector command 1023, the color and intermediate, command 1025 and the color and raster command 1027 which are supplied from the host computer 1001.

In accordance with the monochrome and vector command 1021 or the color and vector command 1023 supplied from the host computer 1001, the full-color intermediate coding portion 1035 produces an intermediate code for each band with which a full color image, that is, an image of the 8-bit-depth for each of RGB (8-bit depth for one color in a case of a monochrome image) can be reproduced. The intermediate codes are temporarily stored in the memory.

In accordance with the intermediate code for each band supplied from the full-color intermediate coding portion

1035 (or the intermediate code for each band contained in the color and intermediate command 1025 supplied from the host computer 1001), the full-color band expanding portion 1037 produces a raster image of the 8-bit-depth for each of RGB for the overall band when the printing engine 51 prints each band. When expansion of half toning band image is performed, also a ROP process for the overlapping portions of the objects is performed.

The full-color conversion portion 1039 converts the raster image of the 8-bit-depth for each of RGB for each band supplied from the full-color band expanding portion 1037 (or a raster image of the 8-bit-depth for each of RGB for each band contained in the color and raster command 1027 supplied from the host computer 1) into a band raster image of the 8-bit-depth for each of CMYK.

The pre-half-toning and compressing portion 1041 converts the band raster image of the 8-bit-depth for each of CMYK supplied from the full-color conversion portion 1039 (or a raster image of the 8-bit-depth for each of CMYK for each band contained in the color and raster command supplied from the host computer 1001) into a band raster image of 2-bit-depth for each of CMYK by an appropriate half toning method. Then, the pre-half-toning and compressing portion 1041 compresses the band raster image by an appropriate reversible compressing method, such as a predicting Huffman coding method, so as to store the compressed band raster image in the memory. Then, the band raster image is transferred to the post half toning circuit 1045.

The full-color compressing portion 1043 compresses the band image of the 8-bit-depth for each of CMYK supplied from the full-color conversion portion 1041 (or a raster image of the 8-bit-depth for each of CMYK for each band contained in the color and raster command supplied from the host computer 1001) by an appropriate reversible compressing method, such as a predicting Huffman coding method, so as to store the full color band image in the memory. Then, the full color band raster image is transferred to the full-color half toning circuit 1047. The full-color half toning circuit 1047 converts the raster image of the 8-bit-depth for each of CMYK into a binary raster image indicating whether or not the dot of each of CMYK is formed. Then, the full-color half toning circuit 1047 supplies the binary raster image to the printing engine 1051. More specifically, the full-color half toning circuit 1047 outputs an 8-bit laser drive pulse based on the raster image of the 8-bit-depth for each of CMYK, using the pulse generating circuit 600 shown in FIG. 2. The content of the pulse generating circuit 600 is common with that shown in FIG. 2, and the pulse width of the laser drive pulse is changed according to the coordinates of each pixel in the 3×3 pixel matrix 7 as aforementioned. This printing manner enables for sense of sight for a human being to make the expression of the gray scale rich, and is suitable for high-quality printing.

As described above, the high-quality image-drawing device 1033 performs the production of the intermediate codes and expansion of the band images on a color space in full color (that is, the 8-bit-depth for each of RGB or CMYK). Therefore, a large quantity of the memory is required and thus the processing speed cannot be raised. However, the ROP can completely be reproduced and thus an image having a high quality can be drawn. The high-quality image-drawing device 1033 is designed to be capable of selecting any one of a plurality of resolutions, which are, for example, 600 dpi, 300 dpi and 150 dpi. The reason for this lies in that text or graphics are expressed such that their edges are clearly reproduced by selecting a high resolution, for example, 600 dpi. When only a natural image is drawn, a low resolution, for example, 300 dpi or 150 dpi, is selected to minimize the required quantity of the memory (if a natural image is reproduced at a resolution of 300 dpi, any deterioration in the image quality cannot be observed by the naked eye as compared with a resolution of 600 dpi).

As will be described later, the following operation is sometimes performed: text and graphics among text, graphics and natural images contained in one page are drawn by the high-speed image-drawing device 1031; and only the natural images are drawn by the high-quality image-drawing device 1033. In the foregoing case, the text and the graphics drawn by the high-speed image-drawing device 1031 are converted into binary images by the post half toning circuit 1045. On the other hand, the natural images drawn by the high-quality image-drawing device 1033 are converted into binary images by the full-color half toning circuit 1047. Then, binary images supplied from the two half toning circuits 1045 and 1047 are synthesized by an OR circuit 1049 so as to be supplied to the printing engine 1051. When both of the image-drawing devices 1031 and 1033 are operated as described above, the two devices 1031 and 1033 independently use the memory space. Since the high-speed image-drawing device 1031 must draw the text and graphics at the high resolution, the structure that the high-quality image-drawing device 1033 is able to select the low resolution is an important fact to prevent use of a great memory and realize appropriately high printing speed.

Figure 11:
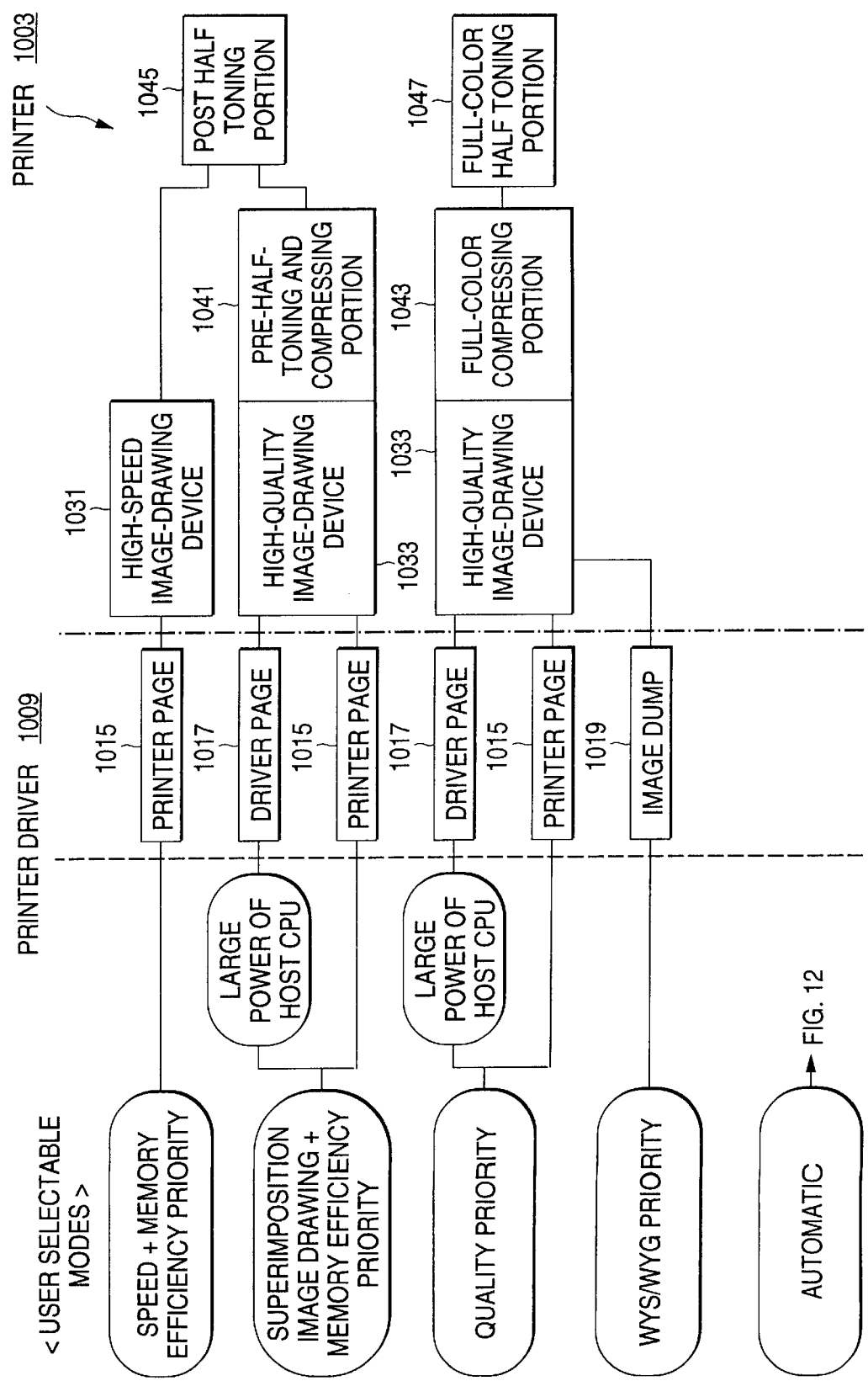
FIG. 11 is a block diagram showing various operation modes which can be selected by the foregoing printing system.

FIG. 11 shows various operation modes which can be selected by the printing system having the above-mentioned structure.

A user is able to select any one of "Speed+Memory Efficiency Priority" "Superimposition Drawing+Memory Efficiency Priority", "Quality Priority", "WYS/WYG Priority" and "Automatic" on a graphic user interface window provided by the printer driver 109. When the user has selected a mode, the job control engine 1011 of the printer driver 1009 performs control in such a manner that the image-drawing process and the half toning process are performed by the illustrated sequential order in accordance with the selected mode. The process which must be performed in each mode will now be described.

When the "Speed+Memory Efficiency Priority" mode is selected, the color printer page driver 1015 of the printer driver 1009 is invoked so that a vector command is produced. The high-speed image-drawing device 1031 of the printer 1003 is invoked so that a raster image of the 2-bit-depth for each of CMYK is produced in accordance with the vector command. Then, the vector command is transferred to the post half toning circuit 1045.

Therefore, the "Speed+Memory Efficiency Priority" mode enables the printing operation to be performed at high speed with a minimum quantity of the memory. Since the foregoing mode cannot substantially reproduce the ROP, the quality of an overlapping portion of objects deteriorates if objects overlap one another. If the objects do not overlap one another, a satisfactory image quality can be obtained.

The "Superimposition Drawing+Memory Efficiency Priority" mode enables a sub-mode "Host CPU Power Enlargement" to be selected if the CPU of the host computer 1001 has satisfactory processing performance. The selection of the sub-mode may be performed by the user or the job control engine 1011 may automatically perform the selection in accordance with the type of the CPU of the host computer 1001 and the capacity of the memory. If the sub-mode "Host CPU Power Enlargement" is selected, the driver page driver

1017 of the printer driver 1009 is invoked so that an intermediate code is produced. That is, the process for producing the intermediate code among the processes for drawing an image is shared by the host computer 1001. If the sub-mode "Host CPU Power Enlargement" is not selected, the color printer page driver 1015 of the printer driver 1009 produces the vector command. In either of the foregoing cases, the high-quality image-drawing device 1033 of the printer 1003 is invoked. Thus, a full color raster image is initially produced, and then converted into an image of 2-bit-depth for each of CMYK in the pre-half-toning and compressing portion 1041, after which the image of the 2-bit-depth for each of CMYK is transferred to the post half toning circuit 1045.

Since the ROP can be reproduced in the "Superimposition Drawing+Memory Efficiency Priority" mode, an image having a high quality can be printed even if objects overlap one another. Since the band image of the 2-bit-depth for each of CMYK is transferred to the post half toning circuit 1045, the required capacity of the memory can be reduced because the band image is not stored. Therefore, high speed printing can be expected as compared with the "Quality Priority" mode. In the sub-mode "Host CPU Power Enlargement", the host computer 1001 having considerably processing performance shares the image-drawing operation. Therefore, further high speed printing can be expected.

Also in the "Quality Priority" mode, the "Host CPU Power Enlargement" mode can be selected. If the foregoing sub-mode is selected, the driver page driver 1017 produces the intermediate code. If the sub-mode is not selected, the color printer page driver 1015 produces the vector command. In either of the foregoing cases, the high-quality image-drawing device 1033 of the printer 1003 produces the full color raster image, and then transfers the full color raster image ti the full-color half toning circuit 1047.

Therefore, the ROP can be reproduced in the "Quality Priority" mode. Thus, an image having a high quality can be printed even if objects overlap one another. Since the full color band raster image is binary-coded by the full-color half toning circuit 1047, an image generally having a high quality can be expected. Moreover, the sub-mode "Host CPU Power Enlargement" enables high-speed printing to be performed.

When the "WYS/WYG Priority" mode is selected, the display device interface 1007 of the host computer 1001 produces a full color raster image. The image dump driver 1019 of the printer driver 1009 forms the full color raster image into a raster command so as to supply the raster command to the printer 1003. The high-quality image-drawing device 1033 of the printer 1003 transfers the full color raster image to the full-color half toning circuit 1047.

Therefore, the "WYS/WYG Priority" mode causes the full color raster image produced by the display device interface 1007 of the host computer 1001. Therefore, an image which cannot faithfully be drawn in another mode can faithfully be reproduced. Thus, the function of the WYS/WYG can be realized.

Figure 12:
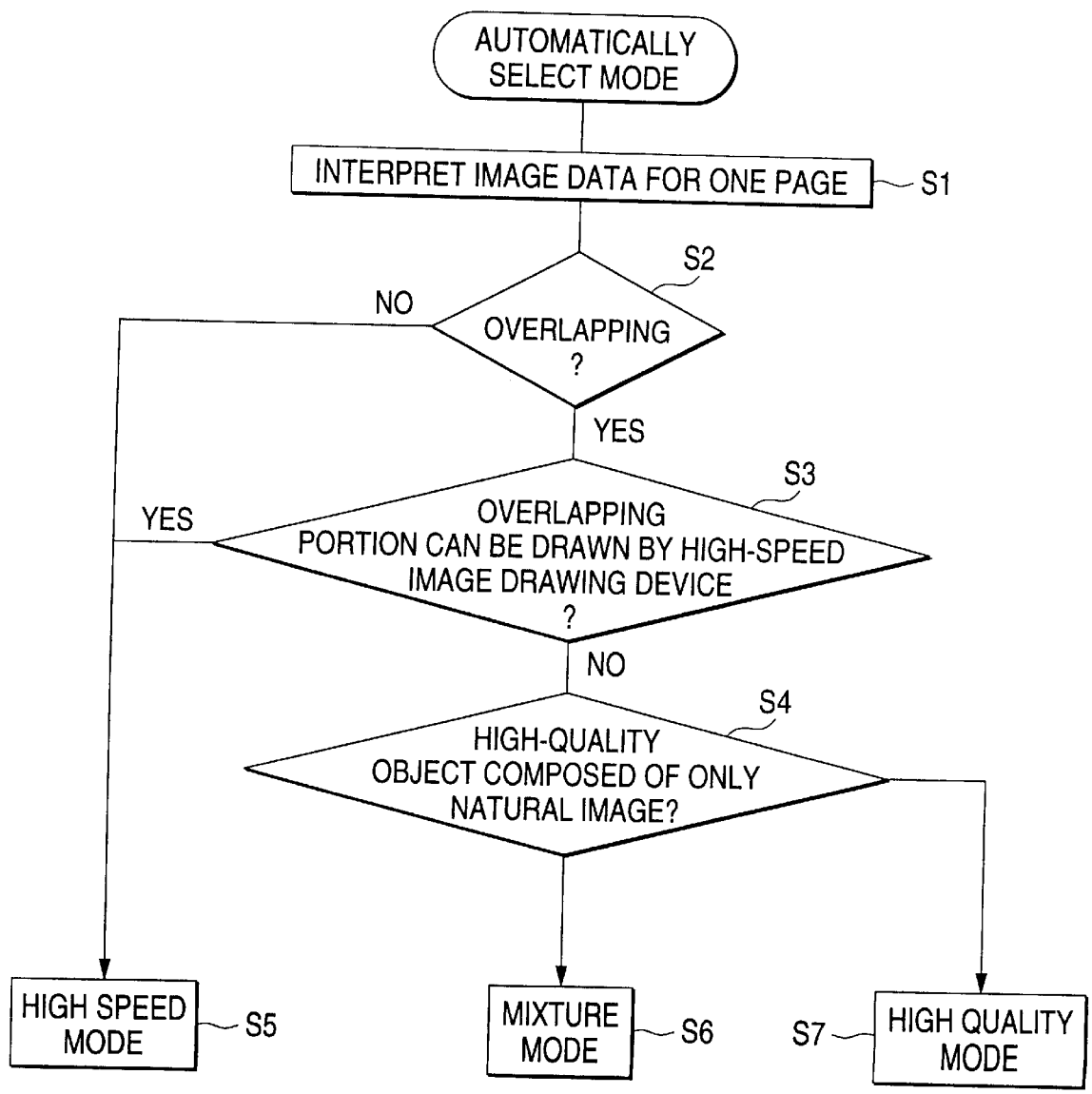
FIG. 12 is a flow chart of an automatic mode selection process.
Figure 13:
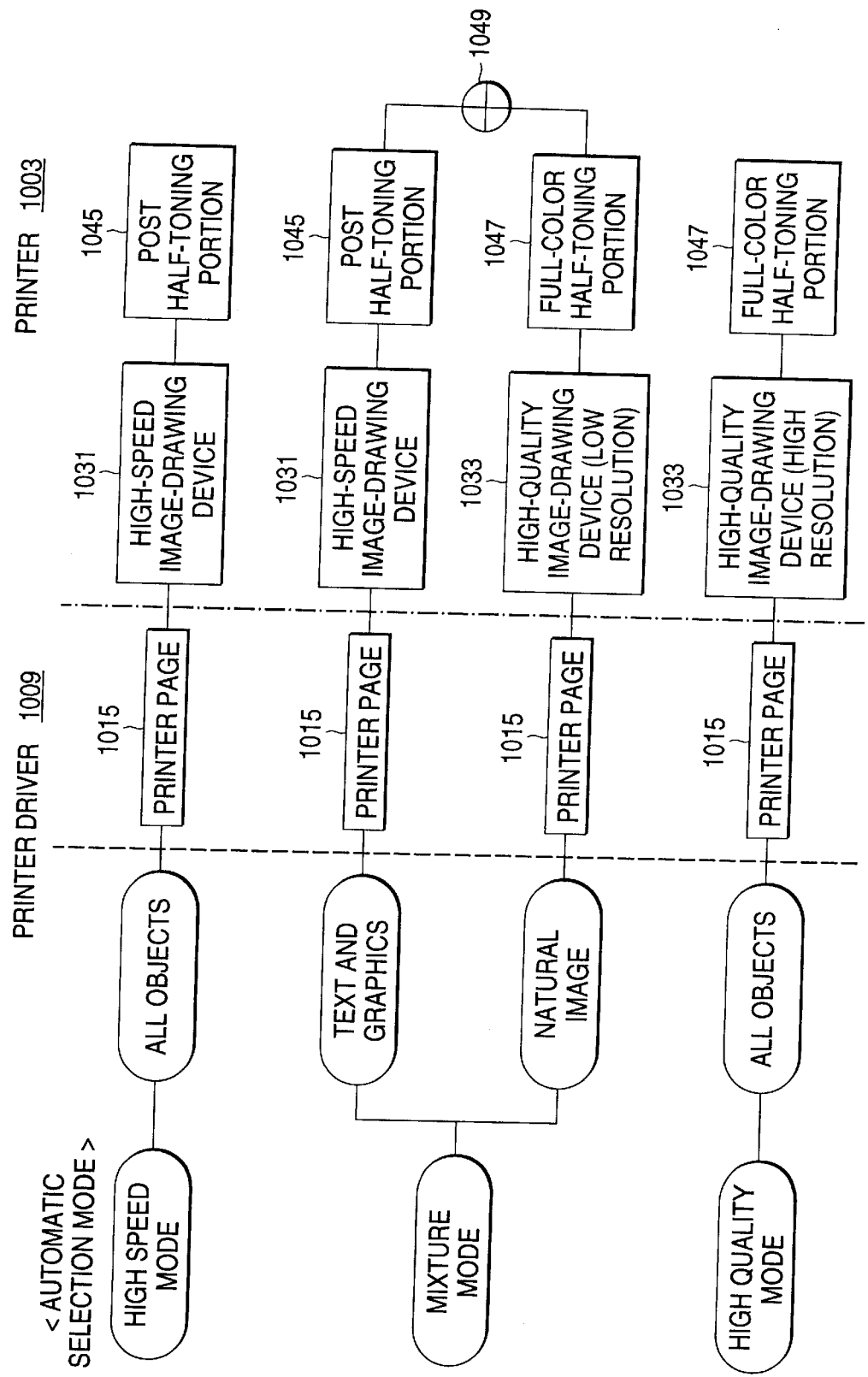
FIG. 13 is a block diagram showing various sub-modes in the automatic mode.

When the "Automatic" mode is selected, the job control engine 1011 automatically selects any one of three modes, that is, "High Speed", "Mixture" and "High Quality". FIG. 12 shows a flow of an automatic selection process which is performed by the job control engine 1011. FIG. 13 shows each of sub-modes.

As shown in FIG. 12, the job control engine 1011 interprets image data of each page of a document which must be printed (step S1). Initially, the job control engine 1011 determines whether or not objects overlap one another (S2). If no object overlaps in one page, the "High Speed" mode is selected (S5).

If an overlapping portion of objects exists in one page, whether or not the overlapping portion can faithfully be reproduced by the high-speed image-drawing device 1031 of the printer 1003 is determined (S3). Specifically, determination is performed as follows in accordance with the ROP and the component colors in the overlapping portions.

(1) If the ROP can be superimposed unconditionally (for example, if one of the objects completely covers the other object and thus only the one of the objects appears or if the overlapping portions are completely white portions), a determination is made that the faithful reproduction can be performed by the high-speed image-drawing device 1031.

(2) If the component colors of the two overlapping objects are solid colors (the color component value of each of RGB or CMYK is zero or a maximum value), a determination is made that ROP of predetermined types except for that defined in (1) can faithfully be reproduced by the high-speed image-drawing device 1031.

(3) Also an ROP of a predetermined type which can normally be drawn only when the same picture is drawn two times is determined that it can faithfully be reproduced by the high-speed image-drawing device 1031.

(4) Also an ROP of a predetermined type which can normally be drawn only when the image has a binary image is determined that it can faithfully be reproduced by the high-speed image-drawing device 1031.

If the foregoing determination is made that the ROP of all of the overlapping portions can be drawn by the high-speed image-drawing device 1031, the "High Speed" mode is selected (S5).

As shown in FIG. 13, in the "High Speed" mode, the overall portion of the page is printed by the printer page driver 1015, the high-speed image-drawing device 1031 and the post half toning circuit 1045 in this sequential order similarly to the "Speed+Memory Efficiency Priority" mode shown in FIG. 11. Since no overlapping portion of objects exists in one page or since the overlapping portions can be drawn by the high-speed image-drawing device 1031, an image having a high quality can be obtained. Moreover, the printing operation can be performed at high speed.

Referring back to FIG. 12, if a determination performed in step S3 results in that an overlapping portion which cannot be drawn by the high-speed image-drawing device 1031 exists, it means that the overlapping portion can be drawn only by the high-quality image-drawing device 1033. In the foregoing case, whether or not the objects of the overlapping portions which can be drawn only by the high-quality image-drawing device 1033 are composed of only natural images is determined (S4). If the objects are composed of only the natural images, the "Mixture" mode is selected (S6).

In the "Mixture" mode, text and graphics in the page are, as shown in FIG. 13, drawn and binary-coded by the printer page driver 1015, the high-speed image-drawing device 1031 and the post half toning circuit 1045 in this sequential order. The natural image is drawn and binary-coded by the printer page driver 1015, the high-quality image-drawing device 1033 and the full-color half toning circuit 1047 in this sequential order. The binary-coded raster images of the text and the graphics and that of the natural image are synthesized in the OR circuit 1049. Note that the high-quality image-drawing device 1033 is operated at the low resolution, such as 300 dpi or 150 dpi, as described above.

In the "Mixture" mode, only the natural image has the overlapping portions which cannot be drawn by the high-speed image-drawing device 1031. The text and graphics are free from the above-mentioned overlapping portions. Only the natural images are drawn by the high-quality image-drawing device 1033, while the text and graphics are drawn by the high-speed image-drawing device 1031. Therefore, the natural images can be printed such that a high quality is realized and the ROP is maintained. Also the text and graphics are printed such that their edges are clearly reproduced and thus a high quality is obtained. Since the high-quality image-drawing device 1033 is operated at the low resolution, the overall capacity of the memory can be saved. Thus, satisfactorily high printing speed can be maintained. Since the text and graphic and the natural images are processed independently, the process (for example, the post half toning circuit 1045) for the text and graphics is permitted to furthermore perform a process for smoothing the edges. As a result, the quality of the text and graphics can furthermore be improved.

Referring back to FIG. 12, if the determination made in step S4 results in that the objects in the overlapping portion which cannot be drawn by the high-quality image-drawing device 33 contain graphics or text, the "High Quality" mode is selected (S7).

In the "High Quality" mode, the printing operation of the overall portion of the page is, as shown in FIG. 13, performed by the printer page driver 1015, the high-quality image-drawing device 1033 and the full-color half toning circuit 1047 in this sequential order, similarly to the "Quality Priority" mode shown in FIG. 11. Note that the high-quality image-drawing device 1033 is operated at the high resolution, for example, 600 dpi, similarly to the high-speed image-drawing device 1031.

Since all images are drawn by the high-quality image-drawing device 1033 in the "High Quality" mode, an image having a high quality can be printed while the ROP is maintained. Moreover, since the image is drawn with the high resolution, for example, 600 dpi, edges of the text and graphics can clearly be printed. Note that a memory having a sufficiently great capacity is required to perform the "High Quality" mode.

Although the invention has been described in its preferred form, it is understood that the present disclosure of the preferred form can be changed in the details of construction and in the combination and arrangement of parts without departing from the spirit and the scope of the invention.

What is claimed is:

1. A printing system comprising:
   a printer driver installed on a host apparatus; and
   a printer arranged to receive an image data issued from said printer driver so as to form an output image,
   wherein said printer comprises:
   (A) a high-speed image drawing device receiving the image data so as to be capable of drawing the output image at high speed;
   (B) a high-quality image drawing device receiving the image data so as to be capable of drawing the output image having a high quality, and printing being performed by selectively using said high-speed image drawing device or said high-quality image drawing device or by combining said devices; and
   (C) a pulse-width data generating means receiving the image data transferred from said high-quality image drawing device so as to cause a printing engine in the printer to form each pixel of the output image from gray-scale data of each pixel in the image data, said pulse-width data generating means comprising:
   (a) a memory having N×M pixel memory regions corresponding to N×M pixels disposed to form N×M pixel matrices on the output image where N and M are positive integers, various pulse-width data corresponding to various values which are possible for the gray-scale data to have, being stored in each of said pixel memory regions, and said memory responding to coordinates of each pixel in said N×M pixel matrices corresponding to the pixels in said image data and the gray-scale data of each pixel in said image data so as to read out, from said pixel memory regions instructed with the coordinates, the pulse-width data corresponding to said gray-scale data; and
   (b) position-data generating means which receives the pulse-width data read from said memory to subject the pulse-width data of pixels on the two sides of each pixel on the output image to a comparison to generate position data corresponding to a result of the comparison, position data being generated for each pixel on the output image.

2. The printing system according to claim 1, wherein said high-quality image drawing device draws the output image in a color space having a relatively large number of colors, and said high-speed image drawing device draws the output image in a color space having a relatively small number of colors.

3. The printing system according to claim 1, wherein said printer driver comprises a job control engine for determining a state in which said high-speed image drawing device and said high-quality image drawing device are operated.

4. A printer arranged to receive an image data issued from a printer driver so as to perform printing, said printer comprising:
   a printing engine;
   a high-speed image drawing device receiving the image data from said printer driver so as to transfer the image data to said printing engine, said high-speed image drawing device being capable of drawing an output image at high speed;
   a high-quality image drawing device receiving the image data from said printer driver so as to transfer the image data to said printing engine, said high-quality image drawing device being capable of drawing the output image having a high quality, and printing being performed by selectively using said high-speed image drawing device or said high-quality image drawing device or by combining said devices; and
   a pulse-width data generating means receiving the image data transferred from said high-quality image drawing device so as to cause said printing engine to form each pixel of the output image from gray-scale data of each pixel in the image data, said pulse-width data generating means comprising:
   a memory having N×M pixel memory regions corresponding to N×M pixels disposed to form N×M pixel matrices on the output image where N and M are positive integers, various pulse-width data corresponding to various values which are possible for the gray-scale data to have, being stored in each of said pixel memory regions, said memory responding to coordinates of each pixel in said N×M pixel matrices corresponding to the pixels in said image data and the gray-scale data of each pixel in said image data so as to read out, from said pixel memory region instructed with the coordinates, the pulse-width data corresponding to said gray-scale data; and
   position-data generating means which receives the pulse-width data read-from said memory to subject the pulse-width data of pixels on two sides of each pixel on the output image to a comparison to generate position data corresponding to a result of the comparison, the position data being generated for each pixel on the output image.

5. The printer according to claim 4, wherein said high-quality image drawing device draws the output image in a color space in full color, and said high-speed image drawing device draws the output image in a color space having a number of colors which is smaller than that in the full color.

6. A recording medium comprising: a computer program which can mechanically be read and which causes a computer to be capable of drawing an output image by selectively using a high-speed image drawing device which is capable of drawing the output image at high speed or a high-quality image drawing device which is capable of drawing the output image having a high quality or by combining said devices, wherein said high-quality image drawing device transfers an image data to a pulse-width data generating means for causing a printing engine in a printer to form each pixel of the output image from gray-scale data of each pixel in the image data, said pulse-width data generating means comprising:

a memory having N×M pixel memory regions corresponding to N×M pixels disposed to form N×M pixel matrices on the output image where N and M are positive integers, wherein various pulse-width data corresponding to various values which are possible for the gray-scale data to have, are stored in each of said pixel memory regions, and said memory responding to coordinates of each pixel in said N×M pixel matrices corresponding to the pixels in said image data and the gray-scale data of each pixel in said image data so as to read out, from said pixel memory regions instructed with the coordinates, the pulse-width data corresponding to said gray-scale data; and position-data generating means which receives the pulse-width data read from said memory to subject the pulse-width data of pixels on two sides of each pixel on the output image to a comparison to generate position data corresponding to a result of the comparison, the position data being generated for each pixel on the output image.

7. A printer driver arranged to supply an image data to a printer, which incorporates a high-speed image drawing device, a high-quality image drawing device and a pulse-width data generating means, said printer driver being installed on a host apparatus, comprising:

a job control engine for determining a state in which said high-speed image drawing device and said high-quality image drawing device are operated, wherein said pulse-width data generating means receives the image data transferred from said high-quality image drawing device so as to cause a printing engine in the printer to form each pixel of an output image from gray-scale data of each pixel in the image data, said pulse-width data generating means comprising:

a memory having N×M pixel memory regions corresponding to N×M pixels disposed to form N×M pixel matrices on the output image where N and M are positive integers, wherein various pulse-width data corresponding to various values which are possible for the gray-scale data to have, are stored in each of said pixel memory regions, and said memory responds to coordinates of each pixel in said N×M pixel matrices corresponding to the pixels in said image data and the gray-scale data of each pixel in said image data so as to read out, from said pixel memory regions instructed with the coordinates, the pulse-width data corresponding to said gray-scale data; and position-data generating means which receives the pulse-width data read from said memory to subject the pulse-width data of pixels on two sides of each pixel on the output image to a comparison to generate position data corresponding to a result of the comparison, the position data being generated for each pixel on the output image.

8. A recording medium comprising: a computer program which can mechanically be read and which serves as a printer driver incorporating a job control engine so as to supply an image data to a printer incorporating a high-speed image drawing device and a high-quality image drawing device, said job control engine being arranged to determine a state in which said high-speed image drawing device and said high-quality image drawing device are operated, wherein said high-quality image drawing device transfers the image data to a pulse-width data generating means for causing a printing engine in said printer to form each pixel of an output image from gray-scale data of each pixel in the image data, said pulse-width data generating means comprising:

a memory having N×M pixel memory regions corresponding to N×M pixels disposed to form N×M pixel matrices on the output image where N and M are positive integers, wherein various pulse-width data corresponding to various values which are possible for the gray-scale data to have, are stored in each of said pixel memory regions, and said memory responding to coordinates of each pixel in said N×M pixel matrices corresponding to the pixels in said image data and the gray-scale data of each pixel in said image data so as to read out, from said pixel memory regions instructed with the coordinates, the pulse-width data corresponding to said gray-scale data; and position-data generating means which receives the pulse-width data read from said memory to subject the pulse-width data of pixels on two sides of each pixel on the output image to a comparison to generate position data corresponding to a result of the comparison, the position data being generated for each pixel on the output image.

* * * * *